US008222778B2

(12) United States Patent
Kabata et al.

(10) Patent No.: US 8,222,778 B2
(45) Date of Patent: Jul. 17, 2012

(54) HIGH-VOLTAGE BUSHING OF A ROTATING ELECTRIC MACHINE

(75) Inventors: Yasuo Kabata, Yokohama (JP);
Yoshihiro Taniyama, Tokyo (JP);
Junichi Uematsu, Kawasaki (JP); Mikio Kakiuchi, Yokohama (JP); Takashi Ueda, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 167 days.

(21) Appl. No.: 12/766,717

(22) Filed: Apr. 23, 2010

(65) Prior Publication Data

US 2010/0270875 A1      Oct. 28, 2010

(30) Foreign Application Priority Data

Apr. 23, 2009   (JP) .................................. 2009-105337

(51) Int. Cl.
*H01B 17/00*   (2006.01)
*H01B 17/36*   (2006.01)
*H02K 9/08*    (2006.01)
*H02K 5/22*    (2006.01)

(52) U.S. Cl. .............. 310/71; 310/52; 310/55; 174/15.3
(58) Field of Classification Search .................... 310/52, 310/55, 71; 174/15.3; 439/198, 206
See application file for complete search history.

(56) References Cited

U.S. PATENT DOCUMENTS

| | | | | | |
|---|---|---|---|---|---|
| 2,683,227 | A | * | 7/1954 | Beckwith | 310/55 |
| 2,742,582 | A | * | 4/1956 | Bahn et al. | 310/52 |
| 2,742,583 | A | * | 4/1956 | Beckwith | 310/57 |
| 4,078,150 | A | * | 3/1978 | Daugherty et al. | 174/15.3 |
| 2008/0296986 | A1 | * | 12/2008 | Kozaki et al. | 310/58 |

FOREIGN PATENT DOCUMENTS

| | | | |
|---|---|---|---|
| JP | 52-009888 | * | 1/1977 |
| JP | 55-103057 | * | 8/1980 |
| JP | 60-16180 B2 | | 4/1985 |
| JP | 5-17780 B2 | | 3/1993 |
| JP | 5-207701 A | | 8/1993 |

* cited by examiner

*Primary Examiner* — Burton Mullins
(74) *Attorney, Agent, or Firm* — Christensen O'Connor Johnson Kindness PLLC

(57) ABSTRACT

According to one embodiment, in a high-voltage bushing of a rotating electric machine, the communicating holes are inclined at least toward a circumferential direction of the hollow conductor or toward a machine external side from a direction vertical to a wall surface of the hollow conductor.

6 Claims, 9 Drawing Sheets

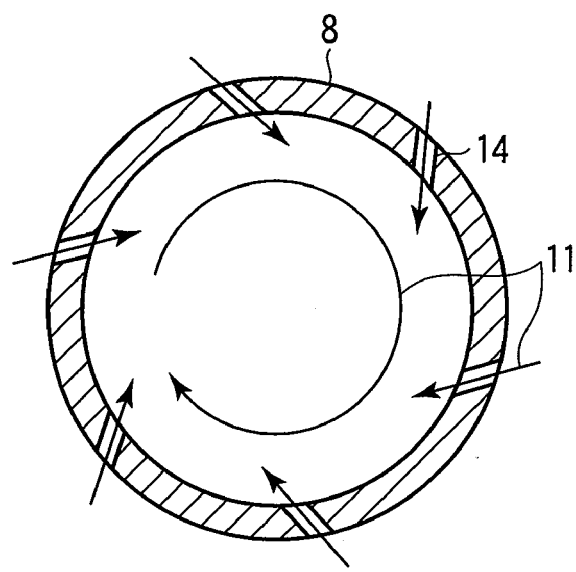
F I G. 2
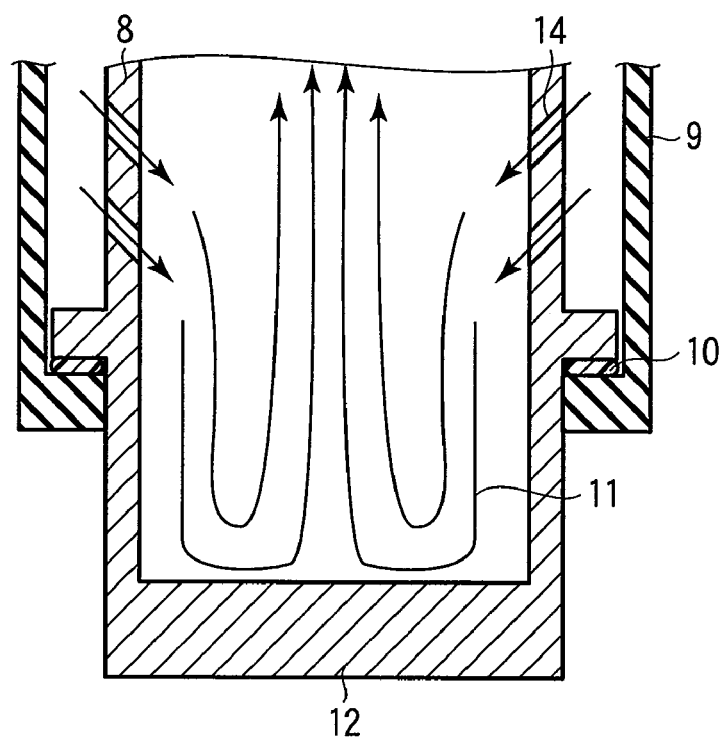
F I G. 3

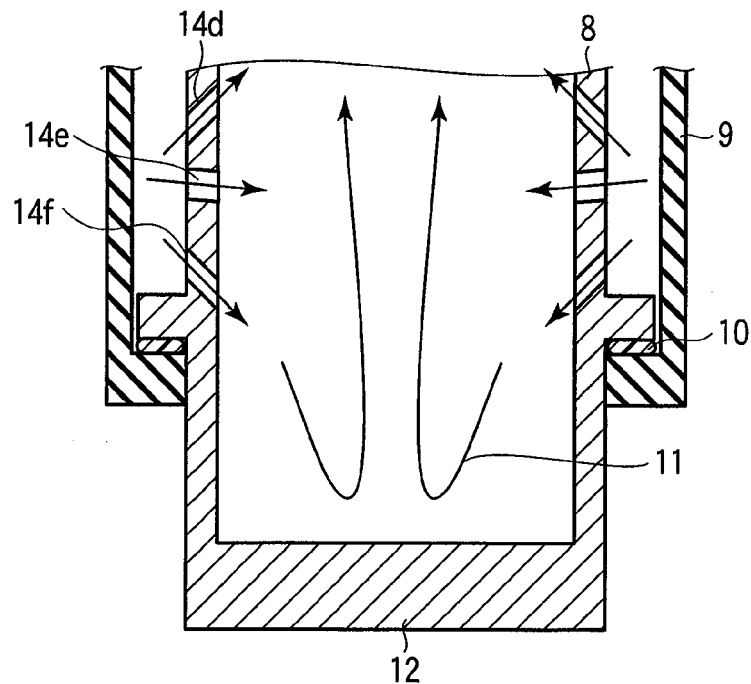
F I G. 12
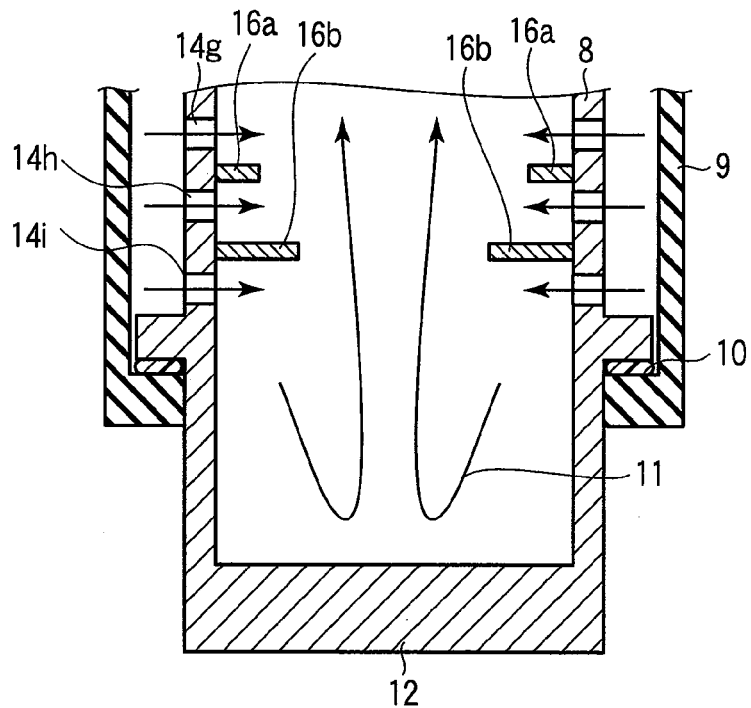
F I G. 14

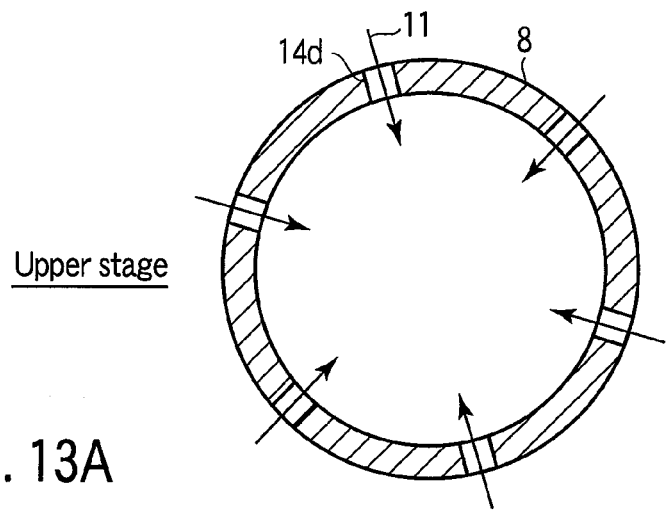
F I G. 13A
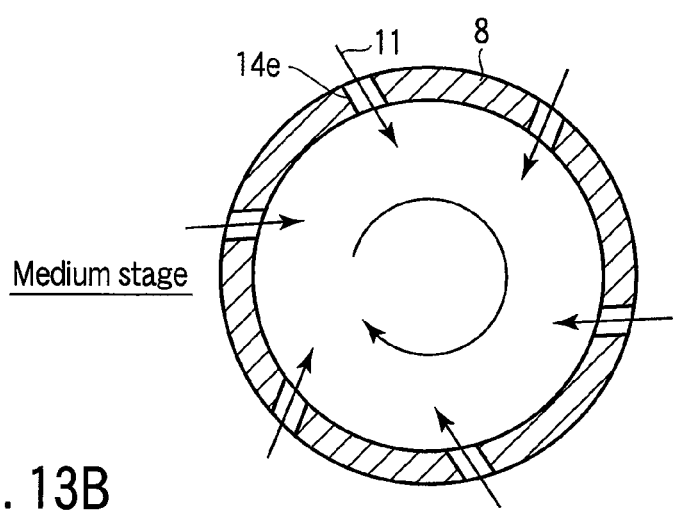
F I G. 13B
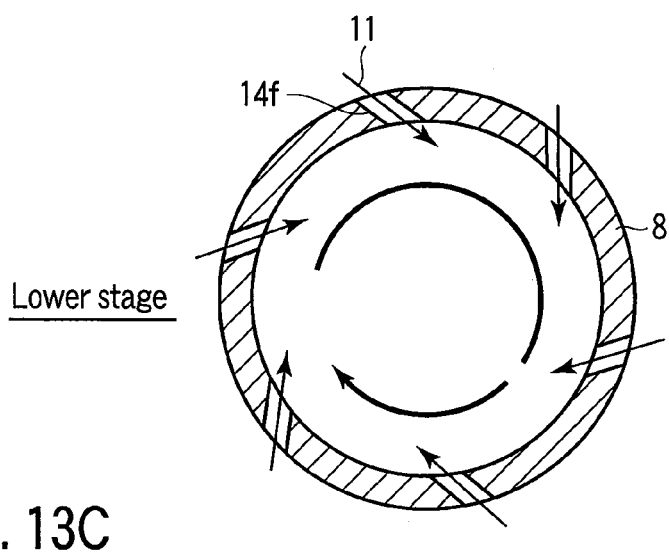
F I G. 13C

HIGH-VOLTAGE BUSHING OF A ROTATING ELECTRIC MACHINE

CROSS-REFERENCE TO RELATED APPLICATIONS

This application is based upon and claims the benefit of priority from Japanese Patent Application No. 2009-105337, filed Apr. 23, 2009; the entire contents of which are incorporated herein by reference.

FIELD

Embodiments described herein relate generally to a high-voltage bushing used for a rotating electric machine.

BACKGROUND

There has been known the cooling structure of a hollow conductor in a high-voltage bushing of a rotating electric machine disclosed in the following Publications. For example, Jpn. Pat. Appln. KOKOKU Publications No. 60-16180, 5-17780 and Jpn. Pat. Appln. KOKAI Publication No. 5-207701 are given.

One example of the cooling structure of a hollow conductor included in a high-voltage bushing of a rotating electric machine will be explained below with reference to FIG. 16 and FIG. 17. FIG. 16 is a view showing the basic structure of a rotating electric machine. FIG. 17 is a view showing the structure of a conventional high-voltage bushing included in a rotating electric machine.

For example, in a large-capacity turbine generator, a hydrogen gas is sealed in a rotating electric machine shown in FIG. 16. The hydrogen gas is used as a cooling medium (coolant) to cool a rotor 1, a stator core 2, a stator coil 3, and the like. A connection from the stator coil 3 to a high-voltage bushing 6a attached to an output terminal box 5 is made by way of a conductor 4 to fetch an electric output outside a rotating electric machine. Moreover, if the stator coil 3 is star-connected to ground its neutral point, an electric output is fetched outside by way of a high-voltage bushing 6b attached to the output terminal box 5 to make a neutral connection. In this case, the output terminal box 5 is attached to a stator frame 7. The foregoing high-voltage bushings 6a and 6b lead a cooling gas 11 into these each bushing to perform cooling.

A high-voltage bushing shown in FIG. 17 has a hollow conductor 8 and an insulator tubeinsulator tube 9 such as an insulator. Specifically, the hollow conductor 8 is attached to a terminal box 5 in state of penetrating the box 5 to fetch an output of a rotating electric machine. The insulator tubeinsulator tube 9 is attached to the outer circumferential side of the hollow conductor 8 to insulate the hollow conductor 8 from the terminal box 5. Further, the insulator tubeinsulator tube 9 has a flange and a seal portion, and is fixed to the terminal box 5. In general, the flange is made of metal, and integrally formed with an insulating portion using a bonding agent.

The hollow conductor 8 penetrates the insulator tubeinsulator tube 9 so that an outside conductor connection part 15 is formed, and is connected to a current lead outside a rotating electric machine. Further, the hollow conductor 8 is fixed to the insulator tubeinsulator tube 9 in a state of forming a clearance by means of a conductor retainer 13. Sealing is provided using a packing 10 so that a cooling gas 11 in the machine is prevented from leaking from a joint portion of the hollow conductor 8 and the insulator tubeinsulator tube 9. Furthermore, the hollow conductor 8 has a structure that a machine-external side end portion 12 is sealed.

The hollow conductor 8 is heated because a large current is carried therein; for this reason, the hollow conductor 8 is cooled by taking the cooling gas 11 of a rotating electric machine therein. Specifically, the cooling gas 11 of the machine is guided into a high-voltage bushing from a notch portion formed in a conductor retainer 13. Then, the cooling gas 11 flows through the clearance between the hollow conductor 8 and the insulator tubeinsulator tube 9, and thereafter, flows outside the machine. In this way, the cooling gas 11 cools the outer circumferential surface of the hollow conductor 8. The cooling gas 11 cooling the outer circumferential surface of the hollow conductor 8 is guided to an inner circumferential side of the conductor 8 by way of a plurality of communicating holes 14 formed in the conductor 8. In this case, each direction (i.e., direction to which the cooling gas 11 is injected) of these communicating holes 14 is vertical to the wall surface of the hollow conductor 8. The cooling gas 11 guided to the inner circumferential side of the hollow conductor 8 flows toward the machine-side end portion of the hollow conductor 8. In this way, the inner circumferential surface of the hollow conductor 8 is cooled. The cooling gas 11 cooling the inner circumferential surface of the hollow conductor 8 is exhausted from the machine-side end portion of the hollow conductor 8.

An inner-diameter side flow passage of the hollow conductor 8 is connected to a portion of a rotating electric machine lower than a cooling gas voltage in the output terminal box 5 given as an inlet side of the cooling gas of a high-voltage bushing, for example, to a fan inlet low-pressure chamber by way of a pipe (not shown). The differential pressure between the foregoing both pressures is used as a drive force so that the cooling gas 11 flows in the high-voltage bushing as described above. In this way, heat generated in the hollow conductor 8 is cooled.

A high-voltage busing has a structure of penetrating the stator frame 7 of the rotating electric machine; for this reason, the high-voltage bushing must be sealed so that a hydrogen gas does not leak outside the machine. In general, a packing 10 (or gasket) used as a seal portion is exposed in high temperature; for this reason, the packing 10 is aged. As a result, the packing 10 does not perform a gas seal function. Therefore, the seal portion needs to make a design so that the seal portion is sufficiently cooled and does not become high temperature.

However, according to the structure of the conventional high-voltage bushing, the external conductor connection part 15 has a projected structure of penetrating the insulator tubeinsulator tube 9. On the other hand, the communicating hole 14 for carrying the cooling gas 11 must be provided inside the insulator tubeinsulator tube 9 considering the flow passage configuration of the cooling gas 11. For this reason, when flowing through the communicating hole, the cooling gas 11 returns soon, and thereafter, flows into the machine. As a result, the flow of the cooling gas 11 stays in an area positioning outside the machine from the communicating hole 14. Therefore, sufficient cooling is not performed; for this reason, the hollow conductor 8 becomes high temperature.

In addition, the cooling gas seal must be given at a position outside the machine from the communication hole 14. For this reason, the packing 10 contacts with high temperature hollow conductor 8; as a result, the packing 10 is aged. Therefore, a hydrogen gas easily leaks.

BRIEF DESCRIPTION OF THE DRAWINGS

FIG. 2 is an axially cross-sectional view showing the hollow conductor 8 shown in FIG. 1;

FIG. 3 is a cross-sectional view showing the hollow conductor 8 shown in FIG. 1 and its peripheral portions when viewing them from the direction vertical to the axial direction;

FIG. 12 is a cross-sectional view showing a hollow conductor 8 and its peripheral portions included in a high-voltage bushing of a rotating electric machine according to a fourth embodiment of the present invention when viewing them from the direction vertical to the axial direction;

FIGS. 13A, 13B and 13C are each-stage cross-sectional view showing a hollow conductor 8 shown in FIG. 12 when viewing the hollow conductor 8 from the axial direction;

FIG. 14 is a cross-sectional view showing a hollow conductor 8 and its peripheral portions included in a high-voltage bushing of a rotating electric machine according to a fifth embodiment of the present invention when viewing them from the direction vertical to the axial direction;

DETAILED DESCRIPTION

Embodiments of the present invention will be described below with reference to the drawings.

(Matters Common to the Following Each Embodiment)

Figure 16:
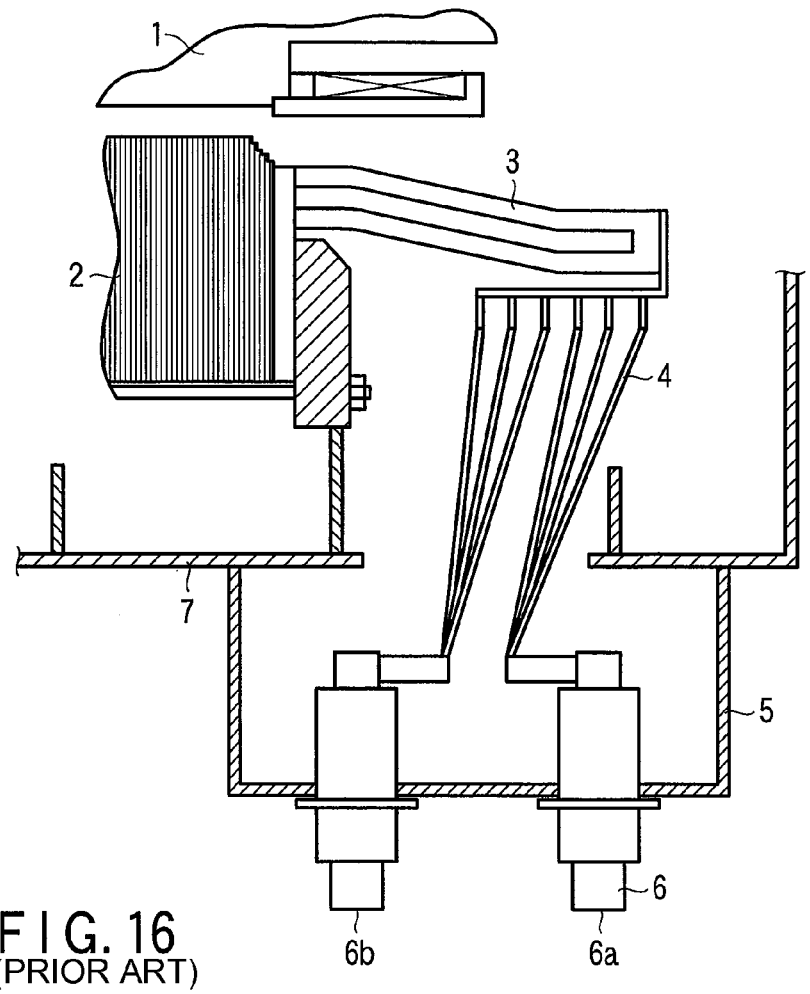
FIG. 16 is a view showing the basic structure of a rotating electric machine.

The basic structure of a rotating electric machine according to each embodiment of the present invention is the same as already described in FIG. 16. Therefore, in each embodiment, the explanation about the basic structure of a rotating electric machine is omitted.

Figure 17:
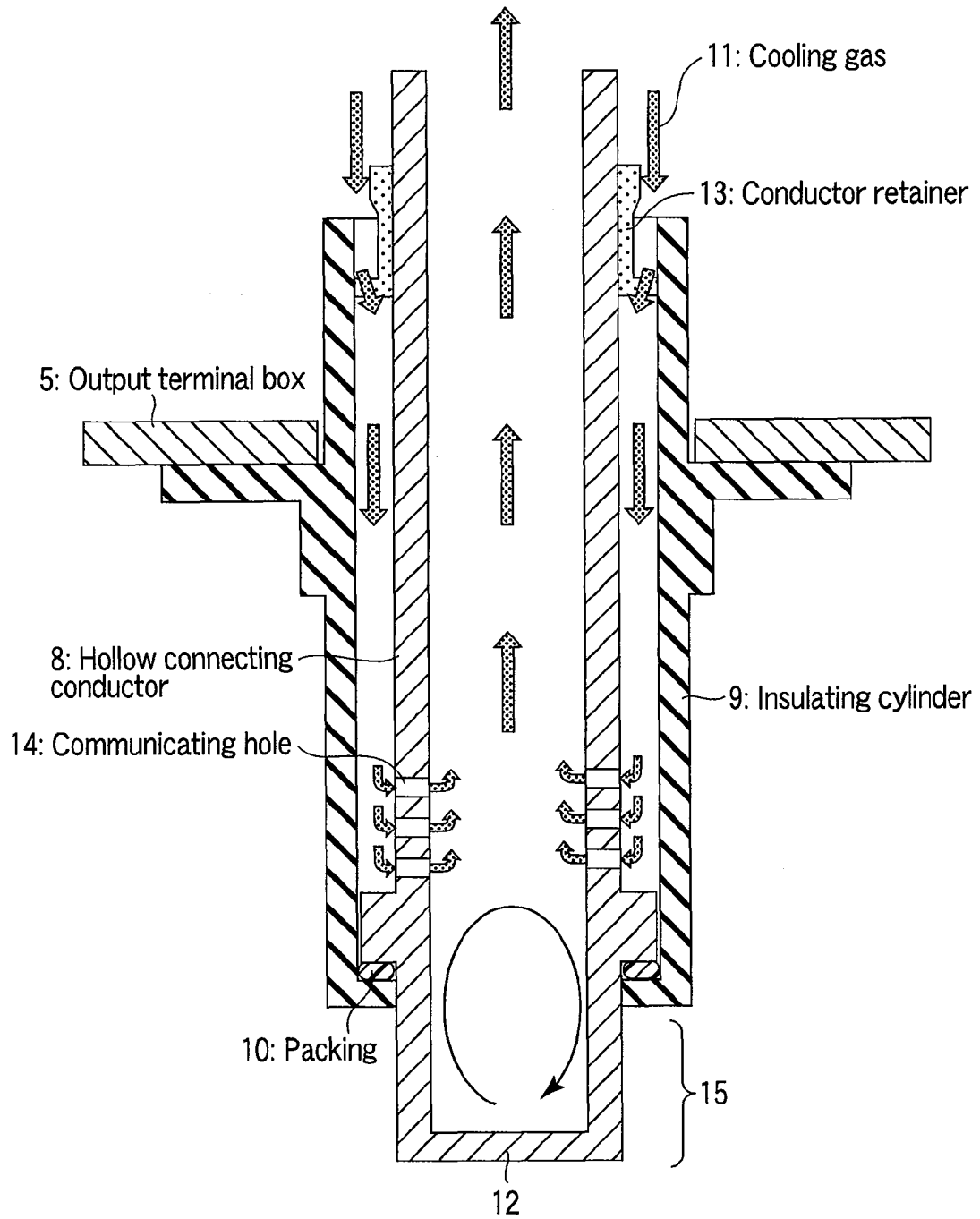
FIG. 17 is a view showing the structure of a conventional high-voltage bushing included in a rotating electric machine.

Moreover, the structure of a high-voltage bushing of a rotating electric machine according to each embodiment of the present invention is the same as described in FIG. 17 except the structure of a communication hole 14. Therefore, in the following each embodiment, the difference of the structure of the communicating hole 14 will be mainly described. According to the following fifth and sixth embodiments, compartments, which have not been provided in the prior art, will be described.

The following each embodiment will be properly described with reference to FIG. 16 and FIG. 17.

(First Embodiment)

A high-voltage bushing of a rotating electric machine according to a first embodiment of the present invention will be described below with reference to FIG. 1 to FIG. 9.

Figure 1:
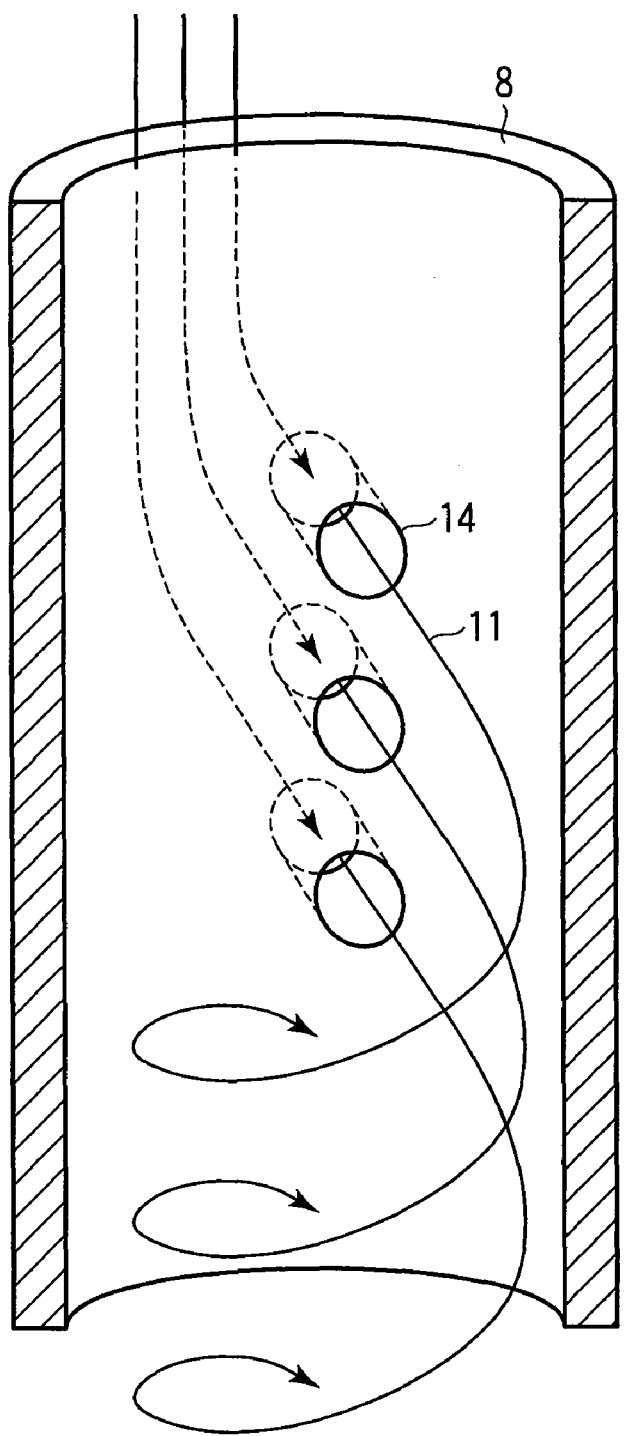
FIG. 1 is an inner-diameter side perspective view showing a hollow conductor 8 included in a high-voltage bushing of a rotating electric machine according to a first embodiment of the present invention.

FIG. 1 is an inner-diameter side perspective view showing a hollow conductor 8 included in a high-voltage bushing of a rotating electric machine according to a first embodiment of the present invention. FIG. 2 is an axial cross-sectional view showing the foregoing hollow conductor 8. FIG. 3 is a cross-sectional view showing the foregoing hollow conductor 8 and its peripheral portions when viewing them from the axial direction.

As shown in FIG. 1 to FIG. 3, a high-voltage bushing of a rotating electric machine according to the first embodiment has a plurality of communicating holes 14. These communicating holes 14 are formed with intervals in both axial and circumferential directions of the hollow conductor 8.

According to the example shown in FIG. 2, the hollow conductor 8 is formed with six communicating holes 14 in the circumferential direction. However, the present invention is not limited to the foregoing configuration; in this case, the communication hole 14 may be formed two to five or seven or more. Moreover, according to the example shown in FIG. 3, the hollow conductor 8 is formed with two-stage communicating holes 14 in the axial direction of the hollow conductor 8. However, the present invention is not limited to the foregoing configuration; in this case, the communication hole 14 may be formed three-stage or more.

In particular, the high-voltage bushing of a rotating electric machine according to the first embodiment has the following features. Namely, the foregoing communicating holes 14 are each inclined from the direction vertical to the wall surface of the hollow conductor 8 toward the circumferential direction of the conductor 8 and toward the outside of the machine. Specifically, the communicating holes 14 each have an inclination toward the circumferential direction. Therefore, as seen from FIG. 1 and FIG. 2, when a cooling gas 11 pass the communicating holes 14, a swirl flow is generated in an inner-diameter side of the hollow conductor 8. Further, the communicating holes 14 each have an inclination toward the outside of the machine. Therefore, as seen from FIG. 3, the flow traveling to a machine-external axial end portion 12 of the hollow conductor 8 is induced. Then, the cooling gas 11 reached the machine-external end portion 12 returns, and thereafter, flows to the machine-internal side through the center axis.

In the high-voltage bushing of a rotating electric machine having the foregoing structure, the cooling gas 11 in the machine is guided into a high-voltage bushing from a notch portion formed in a conductor retainer 13. Further, the cooling gas 11 flows to the machine-external direction passing a clearance between the hollow conductor 8 and an insulator tube 9. In this way, the outside circumferential surface of the hollow conductor 8 is cooled.

The cooling gas 11 cooling the outer circumferential surface of the hollow conductor 8 is guided to the inner circumferential surface thereof passing the communication holes 14 formed in the hollow conductor 8. In this case, each of these communicating holes 14 is inclined from the direction vertical to the wall surface of the conductor 8 toward the circumferential direction of the conductor and toward the machine-external side, as described before. Therefore, the cooling gas injected to the inner-diameter side of the conductor 8 passing communicating holes 14 flows to the machine-external end portion 12 while being spirally rotated, and thus, reaches the end portion 12. In this case, the cooling gas 11 cools an inner-circumferential surface of the hollow conductor 8 positioning on the machine-external side from the communicating hole 14.

The cooling gas 11 cooling the inner-circumferential surface of the hollow conductor 8 positioning on the machine-external side from the communicating hole 14 returns at the machine-external end portion 12. Thereafter, the cooling gas 11 passes the center axial side of the hollow conductor 8, and then, flows toward the machine-internal side thereof. In this way, the cooling gas 11 cools the inner-circumferential surface of the hollow conductor 8. The cooling gas 11 cooling the inner-circumferential surface of the hollow conductor 8 is exhausted from an machine-internal end portion.

An inner-diameter side flow passage of the hollow conductor 8 is connected to a portion of a rotating electric machine lower than a cooling gas pressure in the output terminal box 5 given as an inlet side of the cooling gas of a high-voltage bushing, for example, to a fan inlet low-pressure chamber by way of a pipe (not shown). The differential pressure between the foregoing both pressures is used as a drive force so that the cooling gas 11 flows in the high-voltage bushing as described above. In this way, heat generated in the hollow conductor 8 is cooled.

As described above, each of communicating holes 14 is formed in a state of being inclined from the direction vertical to the wall surface of the hollow conductor 8 toward the circumferential direction of the conductor 8 and toward the machine-external side. The foregoing structure is employed, and thereby, the cooling gas 11 injected to the inner-diameter side of the hollow conductor 8 passing communicating holes 14 flows to the machine-external end portion 12 while being spirally rotated, and thus, reaches the end portion 12. In this case, the cooling gas 11 cools the inner-circumferential surface of the hollow conductor 8 positioning at the machine-external side from the communicating hole 14. Therefore, this serves to keep the hollow conductor 8 on the machine-external side at low temperature.

Further, the hollow conductor 8 contacting with the packing 10 does not become high temperature. Therefore, aging of a sealing member is prevented to the minimum; as a result, it is possible to provide a high-voltage bushing, which prevents a leakage of the cooling gas 11 and has high reliability.

This embodiment relates to the case where each of communicating holes 14 is formed in a state of being inclined from the direction vertical to the wall surface of the hollow conductor 8 toward both of the circumferential direction of the conductor 8 and the machine-external side. However, the present invention is not limited to the foregoing embodiment. For example, each of communicating holes 14 may be inclined from the direction vertical to the wall surface of the hollow conductor 8 toward the circumferential direction only of the conductor 8, or may be inclined toward the machine-external side only.

The following effect is obtained in the case where each of communicating holes 14 is formed in a state of being inclined toward the circumferential direction only. Namely, the flow traveling to the machine-external end portion 12 is not induced; however, a swirl flow is generated on the inner-diameter side of the hollow conductor 8 by means of the flow traveling to the circumferential direction. With the foregoing swirl flow, a swirl flow is newly generated in a stay area on the inner side of the hollow conductor 8 positioning at the machine-external side from communication holes 14. Thus, the stay area is agitated by means of the newly generated swirl flow; therefore, the inner-circumferential surface of the hollow conductor 8 on the machine-external side is cooled.

Moreover, the following effect is obtained in the case where each of communicating holes 14 is formed in a state of being inclined toward the machine-external side only. A swirl flow is not induced; however, the inner-circumferential surface of the hollow conductor 8 on the machine-external side is cooled by means of a flow traveling to the machine-external end portion 12.

Referring now to FIG. 4 to FIG. 9, a circumferential angle, an axial angle and an axial hole pitch of communicating holes 14 formed at intervals in the axial direction to improve a cooling effect will be explained below.

(a) Circumferential Angle

The case where a communicating hole 14 is inclined toward the circumferential direction of a hollow conductor 8 is given as one example.

Figure 4:
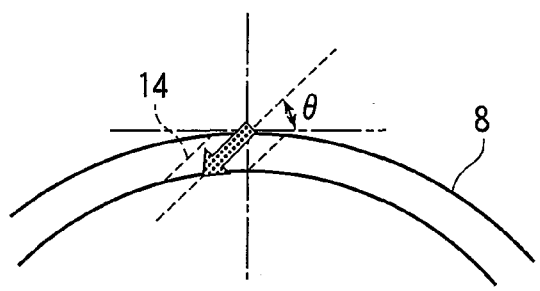
FIG. 4 is a view to explain an angle (circumferential angle) θ of a communicating hole 14 with respect to a wall surface of the hollow conductor 8.

As seen from FIG. 4, an angle (circumferential angle) of the communicating hole 14 to the wall surface of the hollow conductor 8 is set as $\theta$.

Figure 5:
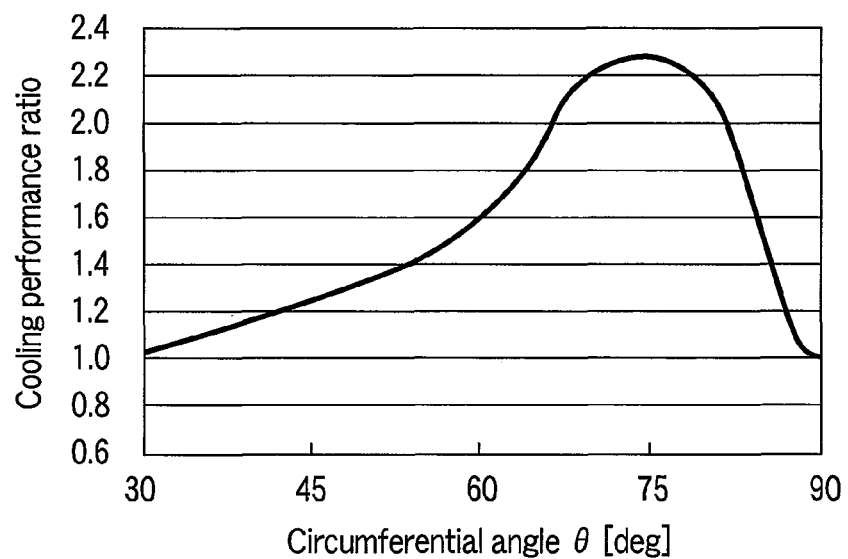
FIG. 5 is a graph to explain the relationship between a circumferential angle θ and a cooling performance ratio.

FIG. 5 is a graph showing the relationship between the circumferential angle $\theta$ and a cooling performance ratio in the foregoing case. In this case, the cooling performance ratio is defined as follows. Namely, the cooling performance ratio is an index showing a cooling performance at an arbitrary circumferential angle $\theta$ when a cooling performance of a state that the angle of the communicating hole 14 is vertical to the wall surface of the hollow conductor 8 ($\theta=90°$) is set as 1. Moreover, the cooling performance is expressed by the product of flow rate and heat conductivity.

As can be seen from FIG. 5, the cooling performance ratio shows the peak in the vicinity of $\theta=75°$. Further, an excellent cooling performance ratio of 1.2 times or more as much as the conventional case is obtained in a range of $40°\leq\theta\leq85°$. In other words, the angle of the communication hole 14 is inclined by 5° or more from a state of $\theta=90°$. In this way, the circumferential flow, which has not been generated so far, is induced; therefore, heat conductivity rapidly rises up. If the angle $\theta$ is set smaller, a circumferential velocity component becomes large; for this reason, an agitating effect by the cooling gas 11 after passed the communication hole 14 becomes high. However, an actual diameter of ventilation decreases, and a pressure loss increases; for this reason, flow rate decreases; as a result, the cooling performance is reduced. Therefore, the communication hole 14 is formed so that the circumferential angle $\theta$ is set to a range of $40°\leq\theta\leq85°$. In this way, a more excellent cooling performance is obtained compared with the conventional case.

(b) Axial Angle

The case where a communicating hole 14 is inclined toward the axial machine-external side of a hollow conductor 8 is given as one example.

Figure 6:
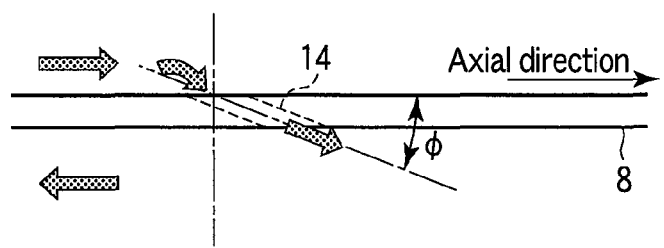
FIG. 6 is a view to explain an angle (axial angle) φ of a communicating hole 14 with respect to a wall surface of the hollow conductor 8.

As seen from FIG. 6, an angle (axial angle) of the communicating hole 14 to the wall surface of the hollow conductor 8 is set as $\phi$.

Figure 7:
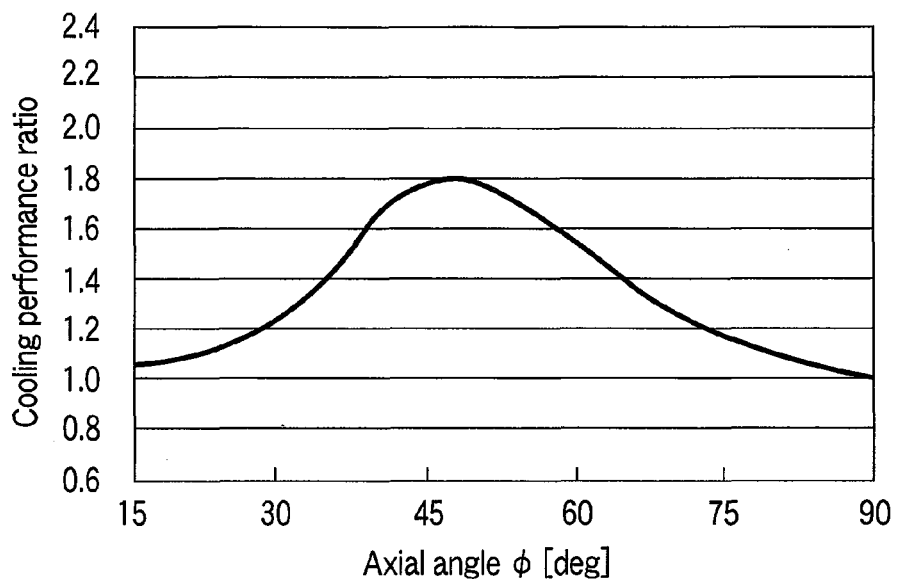
FIG. 7 is a graph to explain the relationship between an axial angle φ and a cooling performance ratio.

FIG. 7 is a graph showing the relationship between the axial angle $\phi$ and a cooling performance ratio in the foregoing case. In this case, the cooling performance ratio is defined as follows. Namely, the cooling performance ratio is an index showing a cooling performance at an arbitrary axial angle $\phi$ when a cooling performance of a state that the angle of the communicating hole 14 is vertical to the wall surface of the hollow conductor 8 ($\phi=90°$) is set as 1. Moreover, the cooling performance is expressed by the product of flow rate and heat conductivity.

As can be seen from FIG. 7, the cooling performance ratio shows the peak in the vicinity of $\phi=50°$. Further, an excellent cooling performance ratio of 1.2 times or more as much as the conventional case is obtained in a range of $30°\leq\phi\leq75°$. In other words, a flow traveling to a machine-external axial end portion 12 is obtained so long as the angle of the communicating hole 14 is inclined by 15° or more from a state of $\phi=90°$. Moreover, if the angle $\phi$ is less than 30°, the flow rate decreases; as a result, the cooling performance is reduced. Therefore, the communication hole 14 is formed so that the axial angle $\phi$ is set to a range of $30°\leq\phi\leq75°$. In this way, a more excellent cooling performance is obtained compared with the conventional case.

(c) Axial Hole Pitch

The case where a plurality of communicating holes 14 is formed at intervals in the axial direction of a hollow conductor is given as one example.

Figure 8:
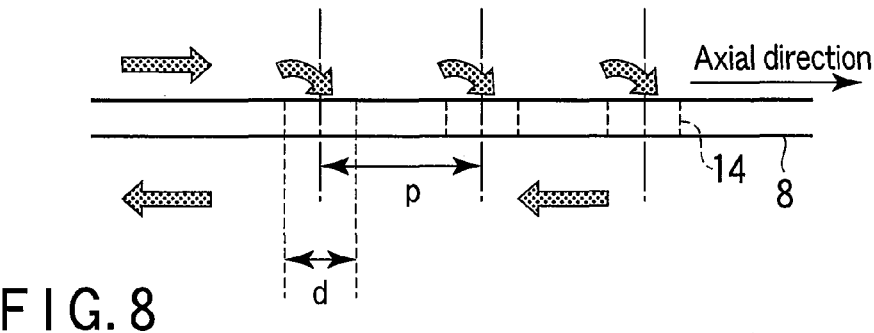
FIG. 8 is a view to explain the relationship between a distance (axial hole pitch) p between center portions of communicating hole 14 neighboring in the axial direction and a hole diameter (diameter) d of a communicating hole 14.

As seen from FIG. 8, a distance (axial hole pitch) between the centers of neighboring communicating holes 14 in the axial direction is set as p. Further, a hole diameter (diameter) of the communicating hole 14 is set as d.

Figure 9:
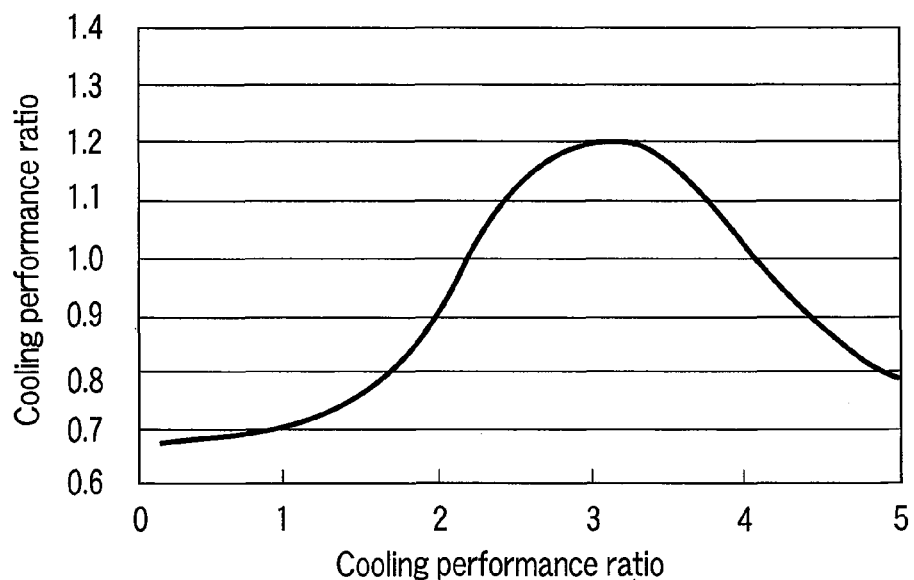
FIG. 9 is a graph to explain the relationship between an axial hole pitch-hole diameter ratio p/d and a cooling performance ratio.

FIG. 9 is a graph showing the relationship between an axial hole pitch-hole diameter ratio p/d and a cooling performance in the foregoing case.

As can be seen from FIG. 9, a cooling performance shows the peak in the vicinity of p/d=3, and an excellent cooling performance of 1.2 or more is obtained. Moreover, a suitable cooling performance more than a predetermined value is obtained in a range of $2.2\leq p/d\leq4.0$. In other words, the communication holes 14 are formed so that the axial hole pitch p is set more than 2.2 times as much as hole diameter d and less than 4.0 times as much as the same. In this way, the cooling gas 11 flowing from the upstream-side communicating hole 14 serves to effectively guide a cooling gas 11 without disturbing the flow of a cooling gas 11 flowing from the downstream-side communication hole 14. Therefore, the hollow conductor 8 can be kept at lower temperature.

(Second Embodiment)

A second embodiment of the present invention will be described below with reference to FIG. 10.

In the second embodiment, the same reference numerals are used to designate portions common to the first embodiment shown in FIG. 1 to FIG. 3, and further, the overlapping explanation is omitted. In the following description, portions different from the first embodiment will be mainly explained.

Figure 10:
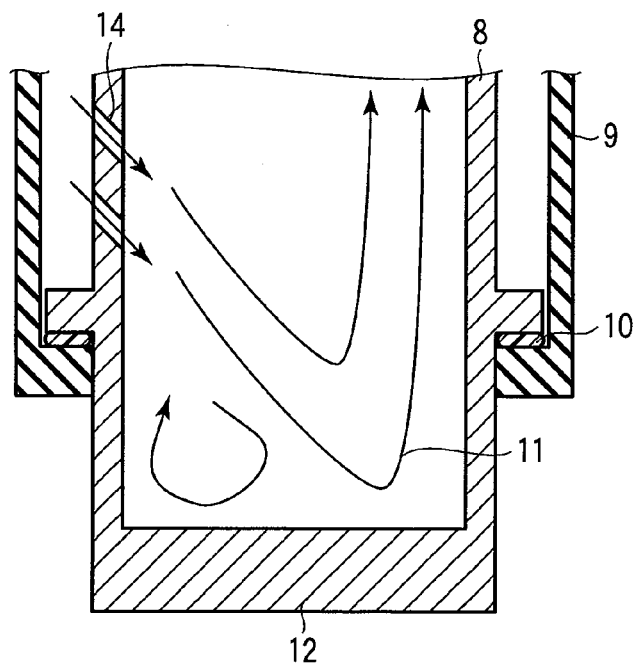
FIG. 10 is a cross-sectional view showing a hollow conductor 8 and its peripheral portions included in a high-voltage bushing of a rotating electric machine according to a second embodiment of the present invention when viewing them from the direction vertical to the axial direction.

FIG. 10 is a cross-sectional view showing a hollow conductor 8 and its peripheral portions included in a high-voltage bushing of a rotating electric machine according to a second embodiment of the present invention when viewing the conductor 8 and its peripheral portions from the direction vertical to the axial direction.

The foregoing first embodiment relates to the case where the hollow conductor 8 is formed with a plurality of communicating holes 14 over the whole of the circumferential direction as shown in FIG. 2. According to this second embodiment, a hollow conductor 8 is formed with a plurality of communicating holes 14 at a half-circumferential portion (i.e., one side) only.

According to the example shown in FIG. 10, the hollow conductor 8 is formed with two communicating holes 12 in the axial direction. However, the present invention is not limited to the foregoing configuration, and the communication hole 14 may be formed three or more.

The foregoing structure is provided, and thereby, as seen from FIG. 10, there is a possibility that a stay area is generated in a part on the inner side of the hollow conductor 8 positioning at the machine-external side from the communicating hole 14. However, a cooling gas traveling to the surface opposite to the side formed with the communicating holes 14 is induced. In this case, the cooling gas 11 collides with the surface opposite to the side formed with the communicating holes 14 to cool an inner-circumferential surface of the hollow conductor 8 on the machine-external side. Therefore, the hollow conductor 8 on the machine-external side can be kept at low temperature.

(Third Embodiment)

A third embodiment of the present invention will be described below with reference to FIG. 11.

In the third embodiment, the same reference numerals are used to designate portions common to the first embodiment shown in FIG. 1 to FIG. 3, and further, the overlapping explanation is omitted. In the following description, portions different from the first embodiment will be mainly explained.

Figure 11:
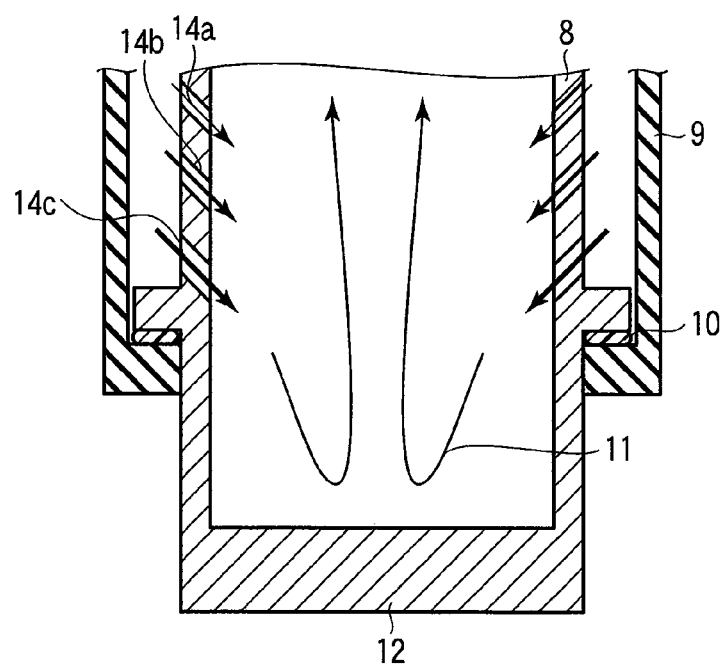
FIG. 11 is a cross-sectional view showing a hollow conductor 8 and its peripheral portions included in a high-voltage bushing of a rotating electric machine according to a third embodiment of the present invention when viewing them from the direction vertical to the axial direction.

FIG. 11 is a cross-sectional view showing a hollow conductor 8 and its peripheral portions included in a high-voltage bushing of a rotating electric machine according to a third embodiment of the present invention when viewing the conductor 8 and its peripheral portions from the direction vertical to the axial direction.

The foregoing first embodiment relates to the case where the hollow conductor 8 is formed with a plurality of communicating holes 14 having the same hole diameter at intervals in the axial direction as shown in FIG. 3. According to this third embodiment, a hollow conductor 8 is formed with a plurality of communicating holes 14a, 14b and 14c having different hole diameter. For example, as seen from FIG. 11, the hole diameter of a communicating hole is set larger successively in the order from the communication hole 14a formed at the most machine-internal side toward the communication hole 14c formed at the most machine-external side. In other words, a communicating hole formed on the machine-internal side has a smaller hole diameter while a communicating hole formed on the machine-external side has a larger hole diameter.

According to the example shown in FIG. 11, the hollow conductor 8 is formed with three stages (upper, medium and lower stages) communicating holes 14a, 14b and 14c. However, the present invention is not limited to the foregoing configuration; in this case, the communicating hole may be formed four stage or more. Moreover, according to the example of FIG. 11, each state is formed with a communicating hole having the different hole diameter. However, the present invention is not limited to the foregoing configuration; in this case, a state having the same hole diameter may be included. For example, heat condition and cooling condition are different depending on the inner diameter of the hollow conductor 8 and the depth of an external conductor part 15. For this reason, the hole diameter of the communicating hole may be set to the same with respect to some of all stages The foregoing structure is provided, and thereby, the flow rate of the cooling gas 11 flowing to the inner-diameter side of the conductor 8 from the machine-external side rather than the machine-internal side increases. Therefore, this serves to effectively supply the cooling gas 11 to a stay area of the hollow conductor 8 on the machine-external side. As a result, the hollow conductor 8 can be kept at low temperature.

(Fourth Embodiment)

A fourth embodiment of the present invention will be described below with reference to FIG. 12 and FIGS. 13A, 13B and 13C.

In the fourth embodiment, the same reference numerals are used to designate portions common to the first embodiment shown in FIG. 1 to FIG. 3, and further, the overlapping explanation is omitted. In the following description, portions different from the first embodiment will be mainly explained.

FIG. 12 is a cross-sectional view showing a hollow conductor 8 and its peripheral portions included in a high-voltage bushing of a rotating electric machine according to a fourth embodiment of the present invention when viewing the conductor 8 and its peripheral portions from the direction vertical to the axial direction.

The foregoing first embodiment relates to the case where the hollow conductor 8 is formed with a plurality of communicating holes 14 having the same inclination in the axial direction of the conductor 8 as shown in FIG. 3. According to this fourth embodiment, as seen from FIG. 12, the hollow conductor 8 is formed with a plurality of communicating holes 14$d$, 14$e$ and 14$f$ having different inclination toward the axial direction of the conductor 8. For example, the communicating hole 14$d$ formed on the most machine-internal side is inclined toward the machine-internal side. The communicating hole 14$f$ formed on the most machine-external side is inclined toward the machine-external side. the communicating hole 14 formed between holes 14$d$ and 14$f$ is horizontally formed. In other words, a communicating hole formed on the machine-internal side has a larger inclination toward the machine-internal side while a communicating hole formed on the machine-external side has a larger inclination toward the machine-external side.

According to the example of FIG. 12, the hollow conductor 8 is formed with three stages (upper, medium and lower stage) communicating holes 14$d$, 14$e$ and 14$f$. However, the present invention is not limited to the foregoing configuration; in this case, the communication hole may be formed four stages or more. In this case, the inclination toward the machine-external side is set larger every stage in order from a communicating hole formed on the most machine-internal side toward a communicating hole formed on the most machine-external side.

The foregoing structure is provided, and thereby, the cooling gas 11 injected from the communicating hole on the machine-external side is effectively supplied to a stay area of the hollow conductor on the machine-external side. Further, the flow traveling to the machine-internal side is induced by means of the cooling gas 11 injected from a communicating hole formed on the machine-internal side. Therefore, the hollow conductor 8 can be kept at low temperature.

Structures shown in FIGS. 13A, 13B and 13C may be further applied in addition to the structure shown in FIG. 12.

FIGS. 13A, 13B and 13C are each-stage cross-sectional view when viewing the hollow conductor 8 from the axial direction.

For example, as shown in FIG. 13A, the communicating hole 14$d$ (i.e., upper-stage communicating hole) formed on the most machine-internal side is not inclined toward the circumferential direction of the hollow conductor 8. As illustrated in FIG. 13C, the communicating hole 14$f$ formed on the most machine-external side is inclined toward the most machine-external side. As depicted in FIG. 13B, the communicating hole 14 interposed between communicating holes 14$d$ and 14$f$ is properly inclined toward the machine-external side. In other words, the communicating hole formed on the machine-external side has a larger inclination toward the machine-external side.

According to the example of FIGS. 13A, 13B and 13C, the hollow conductor 8 is formed with three stages (upper, medium and lower stage) communicating holes 14$d$, 14$e$ and 14$f$. However, the present invention is not limited to the foregoing configuration; in this case, the communication hole may be formed four stages or more. In this case, the inclination toward the machine-external side is set larger every stage in order from a communicating hole formed on the most machine-internal side toward a communicating hole formed on the most machine-external side.

The foregoing structure is provided, and thereby, a stronger swirl flow is generated from the communicating hole on the machine-external side. This serves to effectively agitate a stay area of the hollow conductor 8 on the machine-external side. Therefore, the hollow conductor 8 can be kept at low temperature.

In addition, each inclination of several-stages communicating holes in the axial and circumferential directions is properly changed in accordance with heat condition and cooling condition depending on the inner diameter of the hollow conductor 8 and the depth of the external conductor part 15. In this way, the flow of the cooling gas 11 is controlled so that the hollow conductor 8 is kept at low temperature.

The fourth embodiment shows the case where the structure shown in FIGS. 13A, 13B and 13C is applied in addition to the structure shown in FIG. 12. However, the present invention is not limited to the foregoing structure. For example, the following configuration may be employed as the structure of communication holes 14$d$, 14$e$ and 14$f$. Specifically, the shape only shown in FIG. 12 may be employed without employing the shape shown in FIGS. 13A, 13B and 13C. Conversely, the shape only shown in FIGS. 13A, 13B and 13C may be employed without employing the shape shown in FIG. 12.

(Fifth Embodiment)

A fifth embodiment of the present invention will be described below with reference to FIG. 14.

In the fifth embodiment, the same reference numerals are used to designate portions common to the first embodiment shown in FIG. 1 to FIG. 3, and further, the overlapping explanation is omitted. In the following description, portions different from the first embodiment will be mainly explained.

FIG. 14 is a cross-sectional view showing a hollow conductor 8 and its peripheral portions included in a high-voltage bushing of a rotating electric machine according to a fifth embodiment of the present invention when viewing the conductor 8 and its peripheral portions from the direction vertical to the axial direction.

According to this fifth embodiment, as seen from FIG. 14, a hollow conductor 8 is formed with a plurality of communication holes 14$g$, 14$h$ and 14$i$ at intervals in the axial direction. Further, an inner-circumferential side of the hollow conductor 8 is provided with compartment plates, which extends horizontally in the axial center direction. These compartment plates partially compartment cooling gas injected from the foregoing communicating holes.

For example, a compartment plate 16 is interposed between communicating holes 14$g$ and 14$h$. Likewise, a compartment plate 16 longer than the foregoing compartment plate 16$a$ is interposed between communicating holes 14$h$ and 14$i$. In this case, an area occupied by the compartment plate 16$b$ is about ⅓ of a horizontal area occupied by a hollow portion of the hollow conductor 8.

Moreover, communicating hole 14$i$ may be inclined at least toward the circumferential direction of the hollow conductor 8 or toward the machine-external side from a direction vertical to a wall surface of the hollow conductor 8.

The foregoing structure is provided, and thereby, a cooling gas 11 flowing from communicating holes to the machine-external side remains in a stay area of the hollow conductor 8 for a long time. Therefore, the hollow conductor 8 is effectively cooled; as a result, the hollow conductor 8 is kept at low temperature.

(Sixth Embodiment)

A fifth embodiment of the present invention will be described below with reference to FIG. 15.

In the fifth embodiment, the same reference numerals are used to designate portions common to the first embodiment shown in FIG. 1 to FIG. 3, and further, the overlapping explanation is omitted. In the following description, portions different from the first embodiment will be mainly explained.

Figure 15:
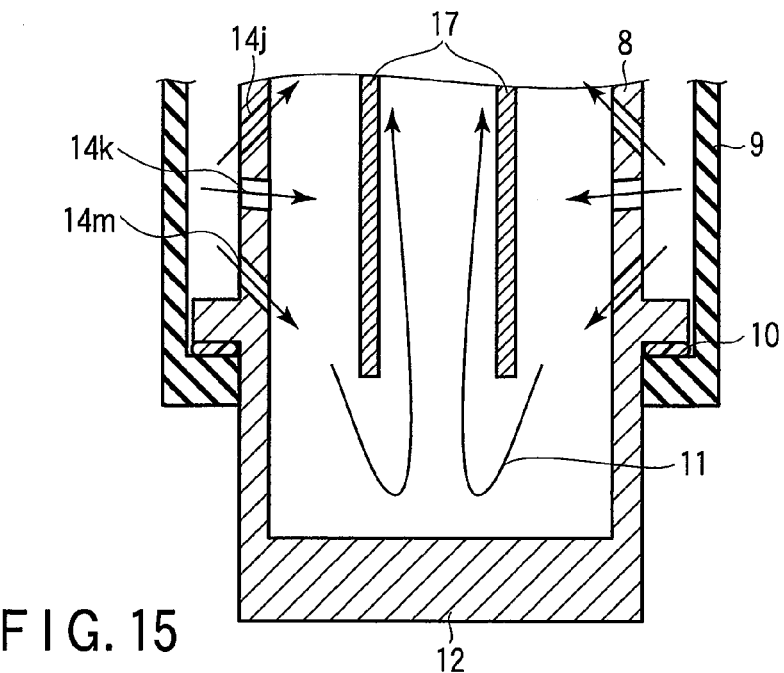
FIG. 15 is a cross-sectional view showing a hollow conductor 8 and its peripheral portions included in a high-voltage bushing of a rotating electric machine according to a sixth embodiment of the present invention when viewing them from the direction vertical to the axial direction.

FIG. 15 is a cross-sectional view showing a hollow conductor 8 and its peripheral portions included in a high-voltage bushing of a rotating machine according to a fifth embodiment of the present invention when viewing the conductor 8 and its peripheral portions from the direction vertical to the axial direction.

According to this sixth embodiment, as seen from FIG. 14, a hollow conductor 8 is formed with a plurality of communication holes 14j, 14k and 14m at intervals in the axial direction. Further, an inner-circumferential side of the hollow conductor 8 is provided with an inner cylinder 17. The inner cylinder 17 is used for guiding a cooling gas 11 from a machine-external end portion of the hollow conductor 8 to a machine-internal end portion thereof.

For example, as seen from FIG. 15, the inner cylinder 17 is provided so that the machine-external end portion of the inner cylinder positions above a stay area. In this case, a horizontal area occupied by a hollow portion of the inner cylinder 17 is about ⅓ of a horizontal area occupied by a hollow portion of the hollow conductor 8.

Moreover, the communicating hole 14j formed on the most machine-internal side is inclined toward the machine-internal side. The communicating hole 14m formed on the most machine-external side is inclined toward the machine-external side. The communicating hole 14k formed between communicating holes 14i an 14j is horizontally formed. In other words, the communicating hole formed on the machine-internal side has a larger inclination toward the machine-internal side. The communicating hole formed on the machine-external side has a larger inclination toward the machine-external side. According to the example of FIG. 15, the hollow conductor 8 is formed with three stages (upper, medium and lower stages) communication holes 14j, 14k and 14m at intervals in the axial direction. However, the present invention is not limited to the foregoing configuration; in this case, the communicating holes may be formed four stages or more. In this case, the inclination toward the machine-external side is set larger every stage from a communicating hole formed on the most machine-internal side toward a communicating hole formed on the most machine-external side.

The foregoing configuration is employed, and thereby, the cooling gas 11 flowing from communicating holes to the machine-external side secures a flow path of the cooling gas 11 returning from a stay area of the hollow conductor 8 to the machine-internal side. Therefore, the cooling gas 11 is effectively supplied to the stay area of the hollow conductor 8. In this way, the hollow conductor 8 is kept at low temperature.

As described above, according to each embodiment, it is possible to provide a high-voltage bushing of a rotating electric machine, which can effectively cool a hollow conductor.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A high-voltage bushing of a rotating electric machine, comprising:

a hollow conductor penetrating an output terminal box of a rotating electric machine in which a cooling gas is sealed, and fetching an output of the rotating electric machine;

an insulator tube provided outside the hollow conductor, and insulating the hollow conductor from the output terminal box; and a seal member preventing a cooling gas in the machine from leaking outside the machine from a jointed portion of the hollow conductor and the insulator tube, the cooling gas in the machine flowing to a machine external direction passing a clearance between the hollow conductor and the insulator tube, and the cooling gas flowing to the machine external direction being guided to an inner circumferential side of the hollow conductor passing a plurality of communicating holes formed in the hollow conductor, and further, the cooling gas guided to the inner circumferential side being guided to a machine internal side of the hollow conductor so that it is exhausted, and the communicating holes being inclined at least toward a circumferential direction of the hollow conductor or toward a machine external side from a direction vertical to a wall surface of the hollow conductor.

2. The high-voltage bushing according to claim 1, wherein the communicating holes are inclined from the direction vertical to the wall surface of the hollow conductor toward both of the circumferential direction of the hollow conductor and the machine external side.

3. The high-voltage bushing according to claim 1, wherein the communicating holes are formed at intervals in the axial direction of the hollow conductor, and a communicating hole formed on a machine external side has a larger hole diameter.

4. The high-voltage bushing according to claim 1, wherein the communicating holes are formed at intervals in the axial direction of the hollow conductor, and a communicating hole formed on a machine external side has a large inclination toward a circumferential direction or toward a machine external side.

5. The high-voltage bushing according to claim 1, wherein the communicating holes are formed at intervals in the axial direction of the hollow conductor, and an inner circumferential side of the hollow conductor is provided with a compartment for partially compartmenting cooling gases injected from each communicating hole.

6. The high-voltage bushing according to claim 1, wherein the communicating holes are formed at intervals in the axial direction of the hollow conductor, and an inner circumferential side of the hollow conductor is provided with an inner cylinder for guiding a cooling gas from a machine external end portion of the hollow conductor to a machine internal end portion.

* * * * *